R. S. TOWNE & C. ROBINSON.
PROCESS OF EXTRACTING METALS FROM ORES.
APPLICATION FILED JULY 14, 1910. RENEWED MAR. 8, 1915.
1,156,382. Patented Oct. 12, 1915.
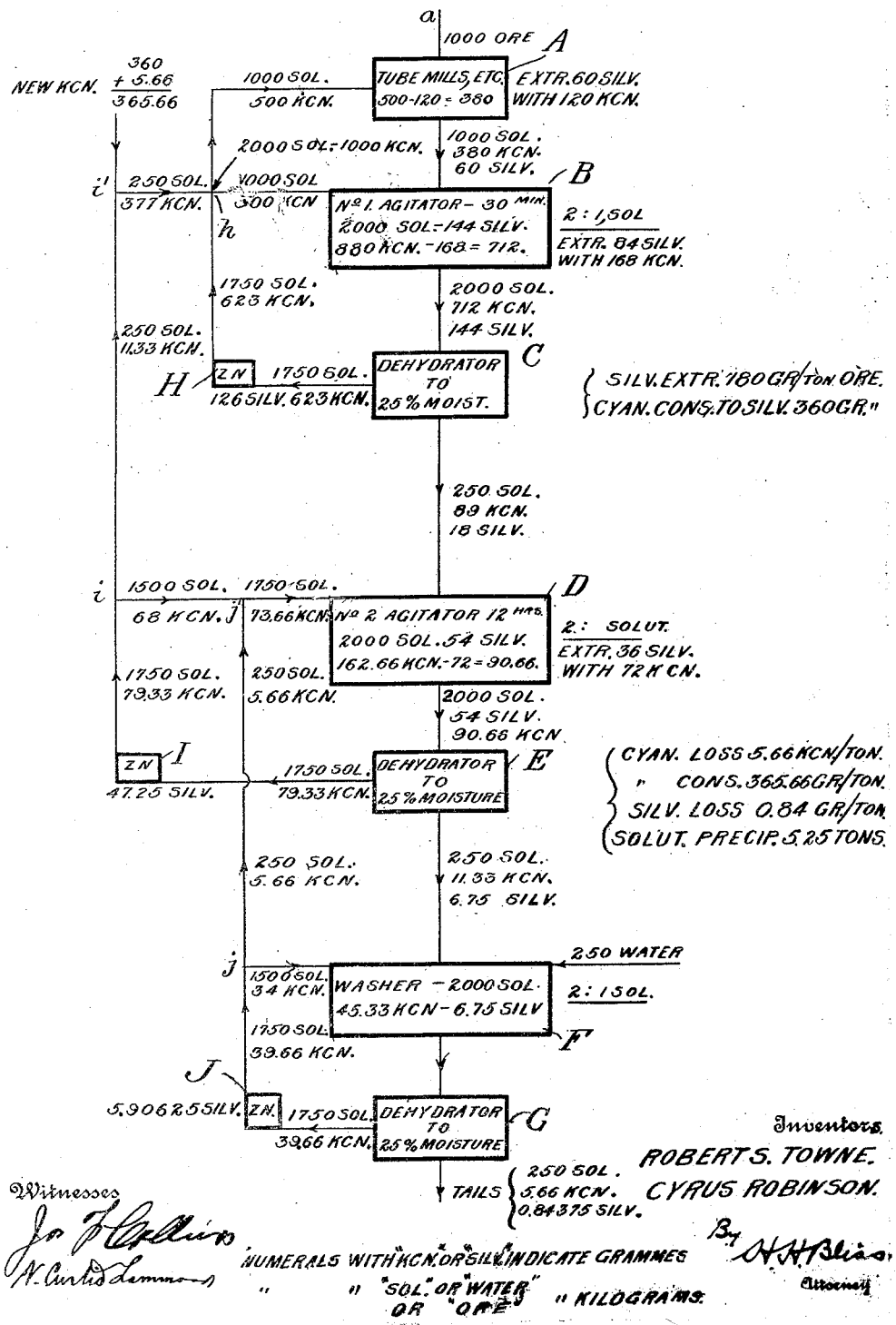

UNITED STATES PATENT OFFICE.

ROBERT S. TOWNE, OF NEW YORK, AND CYRUS ROBINSON, OF MOUNT VERNON, NEW YORK, ASSIGNORS TO METALLURGICAL ENGINEERING & PROCESS CORPORATION, A CORPORATION OF NEW YORK.

PROCESS OF EXTRACTING METALS FROM ORES.

1,156,382.  Specification of Letters Patent.  Patented Oct. 12, 1915.

Application filed July 14, 1910, Serial No. 572,024. Renewed March 8, 1915. Serial No. 12,913.

*To all whom it may concern:*

Be it known that we, ROBERT S. TOWNE, a citizen of the United States, residing at New York, in the county and State of New York, and CYRUS ROBINSON, a subject of the King of Great Britain and Ireland, residing at Mount Vernon, in the county of Westchester and State of New York, have invented certain new and useful Improvements in Processes of Extracting Metals from Their Ores, of which the following is a specification, reference being had therein to the accompanying drawing.

Our invention relates to the extraction of soluble metal values from ores. We have devised what may be regarded as a multiple cycle process for the extraction of such values, the several cycles being successive in order and to a certain extent independent of each other. The separate cycles are, however, very closely related, not only on account of the passage of the ore to be treated from one cycle to another, but also on account of the movement of the solutions, which are used, from one cycle to another to maintain a proper distribution, as will be hereinafter more fully set forth.

One of the objects of the invention is to effect the extraction of the ore much more rapidly than has been possible by any process heretofore followed and known to us.

Another object is to effect the extraction of the maximum amount of the metallic value with the minimum loss of value in the tailings.

A still further object is to provide a continuous process in which the unused solutions at the end of the series of steps may be returned and re-used without destroying the continuity of the process.

Other objects are effected and attained and these will be readily understood from the following description.

In the accompanying drawing, there is shown diagrammatically an apparatus by means of which our improved process may be carried out.

On the drawing, we have noted for purposes of illustration the quantities of ore, solvent and metal which are present at the various stages of the process, it being assumed that a silver ore is under treatment by the cyanid process. It is also assumed that there are 180 grams of silver per ton of ore and that 360 grams of cyanid are required to extract the 180 grams of silver from each ton. It is to be remembered, of course, that the figures which are presented are used merely by way of illustration and that very wide variations are possible from the quantities given, such variations being dependent not only on the metal which is being extracted, but also on the quantity per ton and on the character of the ore.

Referring to the drawing, A indicates a tube mill or other preferred form of reducing apparatus. To this mill solvent is supplied, in the example used 1000 kilograms of solution containing 500 grams of cyanid being used for each 1000 kilograms of ore. From the tube mill A the mixed ore and solution is passed to the receptacle B. It is assumed that in the mill A and during the passage to the receptacle B, 120 grams of cyanid are used to extract 60 grams of silver. The receptacle B therefore receives from A 1000 kilograms of ore, 1000 kilograms of solution, 380 grams of cyanid and 60 grams of silver. There is also supplied to the receptacle B for each unit quantity of ore and solvent, as above set forth, 1000 kilograms of solution containing 500 grams of cyanid. The receptacle B is provided with means for relatively rapidly or violently agitating the mixed ore and solvent. So far as our present invention is concerned, this agitator may be of any desired form, and may be of the type in which a tank is filled with the mixture and then emptied at the end of the period of agitation. We prefer, however, to use a continuous process agitator in which the material is constantly supplied at one end and discharged at the other, the agitator being so designed that a sufficiently long time will be required for material to pass from the intake end to the discharge end.

The agitation in B is quite active and the material is subjected to it in the example used for about thirty minutes. During this period, it is assumed that 168 grams of cyanid will have been used in extracting 84 grams of silver, the result being that the receptacle B contains at the end of the period of agitation 1000 kilograms of ore, 2000 kilograms of solution, 712 grams of cyanid and 144 grams of silver. From B the mixture passes to a dehydrator C which may be of any desired form and which serves to separate the solvent with its dissolved values from the ore. The ore then passes from the dehydrator C and carries with it about 25% or 250 kilograms of solution. This is one-eighth of the total solution which is supplied to the dehydrator and it will contain one-eighth of the cyanid and the silver supplied, i. e., 89 grams of cyanid and 18 grams of silver. The solution discharged from the dehydrator C passes to a zinc tank H which may be of any usual or preferred type and which serves to precipitate the metal from the solution. The barren solution containing 623 grams of cyanid then passes on to the point $h$ where it is mixed with 250 kilograms of solution containing 377 grams of cyanid, the total incoming solution at $h$, therefore, being 2000 kilograms with 1000 grams of cyanid. At $h$ the solution is divided into equal parts, one part flowing to the tube mills and the other part to the agitator B.

The moist ore from the dehydrator C passes to the agitator D which may be similar in character to the agitator B, but in which the mixture is subjected to a much less rapid or less violent agitation, the agitator, if of the continuous type, being designed to require about twelve hours for the passage of material through it. For each unit quantity of ore supplied to the agitator D, there is supplied 1750 kilograms of solution containing 73.66 grams of cyanid. It is assumed that 72 grams of cyanid are used in this agitator to unite with 36 grams of silver, the result being that when the mixture leaves the agitator it contains 1000 kilograms of ore, 2000 kilograms of solution, 90.66 grams of cyanid and 54 grams of silver. This mixture passes to the dehydrator E where the solution and the ore are separated, the ore being left 25% moist. With the ore there passes out, therefore, 250 kilograms of solution containing 11.33 grams of cyanid and 6.75 grams of silver. The 1750 kilograms of solution then passes to the zinc tank I where the silver is precipitated, the resultant barren solution containing 79.33 grams of cyanid passes on to the point $i$ where it is divided, 1500 kilograms containing 68 grams of cyanid going to agitator D, and 250 kilograms containing 11.33 grams of cyanid going to the point $i'$. At $i'$ there is supplied 365.66 grams of cyanid and the solution then containing 377 grams of cyanid passes to the point $h$, as above described.

The moist ore from the dehydrator E passes to the washer F where it is subjected to an incoming supply of 250 kilograms of fresh water and to 1500 kilograms of solution containing 34 grams of cyanid. The action of the washer is quite rapid and as the solution is weak, it is assumed that no further extraction of silver takes place there. As the mixture leaves the washer it will contain 1000 kilograms of spent ore, 2000 kilograms of solution, 45.33 grams of cyanid and 6.75 grams of silver. This mixture passes to the dehydrator G, where the solution and the ore are separated, the ore being left 25% moist, as in the case of the previous dehydrators. The spent ore or tailings discharged from the dehydrator G carries with it 250 kilograms of solution containing 5.66 grams of cyanid and .84375 grams of silver. These latter two values represent, respectively, the loss of cyanid and silver in the tailings per 1000 kilograms of ore.

The solution from the dehydrator G passes to the zinc tank J where the metal is precipitated, the resultant barren solution containing 39.66 grams of cyanid passes to the point $j$ where it divides, 1500 kilograms containing 34 grams of cyanid passing to the washer F, and 250 kilograms containing 5.66 grams of cyanid passing to the point $j'$ where it unites with the solution from the point $i$ and flows with it to the agitator D.

It will be noted that 120 grams of cyanid are used at A, 168 at B, and 72 at D, making a total of 360. There are also lost in the tailings 5.66 grams and there must, therefore, be supplied to the system 365.66 grams of cyanid. This is done, as before described, at the point $i'$.

We especially call attention to the fact that our improved process involves the use in combination of a primary, relatively rapid agitator in which is used a relatively strong solution and a relatively slow agitator in which is used a relatively weak solution. We are aware that it has been heretofore proposed to successively treat ore bodies with strong and weak solutions, but we believe it to be novel to use a continuous process in which the ore is violently agitated at one point in a strong solution separated from the strong solution and then less violently agitated at another point in a weak solution. We have shown for purposes of illustration two agitators and two dehydrators, but it will be understood that if necessary, on account of the character of the ore or for other reasons, additional steps or cycles can be added. It is furthermore to be understood that while we have shown and prefer to use the washer F and the dehydrator G, these may be omitted without departing from the spirit of our invention.

Attention is called to the fact that so far as the first cycle is concerned, the greater part of the solution from the dehydrator C is returned to either the mill A or the agitator B. So far as the second cycle is concerned, the greater part of the solution from the dehydrator E is returned to the agitator D. So far as the third cycle is concerned, the greater part of the solution from the dehydrator G is returned to the washer F. It will therefore be noted that each cycle is in a measure distinct, and that the only free solution that flows from one to the other is that necessary to offset the amount carried with the dehydrated ore. In this way, only a small part of the strong solution of the first cycle is mixed with the weaker solution of the second cycle, and only a small proportion of the solution of the second cycle is mixed with the very weak solution of the third cycle.

We desire to again emphasize the fact that the quantities and proportions which have been indicated in the drawings and used in the foregoing description have merely been selected as illustrations of the way in which the balance is maintained between the various parts of an apparatus used for carrying out our process. For any definite ore, however, the quantities of solvents, cyanid, and values at the various points can be accurately determined by calculation and experiment and when once determined can be maintained constant.

From the foregoing description, it will be clear that our improved process can be carried out continuously, it being possible and, in fact, preferable, for the ore that is subjected to treatment to pass continuously from the set of mechanical parts employed for carrying out one of the cycles to the set of mechanical parts employed for carrying out the succeeding cycle. The advantages incident to the continuous carrying out of the process will be readily apparent. The quantity and strength of the solutions at various points can be accurately regulated in accordance with the quantity and value of the ore, and the various quantities and strengths, once being determined, can remain fixed. In fact, it is possible to maintain the whole system in equilibrium by adding at $i'$ the proper quantity of fresh liquid and fresh solvent, and this is made possible by the continuity of the several steps of the process.

We do not herein claim as part of our present invention the particular arrangement of mechanical devices which we have diagrammatically illustrated. This, or a similar arrangement of devices, is shown and claimed in our co-pending application for apparatus for extracting metals from ores, Serial No. 604,176, filed January 24, 1911.

What we claim is:—

1. The herein described process for effecting the separation of soluble values from a mass, it consisting in subjecting the mass to the action of a solvent solution of comparatively high dissolving efficiency for a comparatively short period of time, positively and actively agitating the mass and the solution during the said period, subjecting the mass to a positive and active dehydration, thereby withdrawing from it a major portion of the solution together with the dissolved values contained therein, subjecting the remaining mass to the action of a similar solvent solution of comparatively low dissolving efficiency for a comparatively long period of time, positively and actively agitating the mass and the solution during the said period, subjecting the mass to a second positive and active dehydration thereby withdrawing from it a major portion of the second solution together with the dissolved values contained therein, and extracting the dissolved values from each of the said withdrawn solutions independently of the other.

2. The herein described process for effecting the separation of soluble values from a mass, which consists in subjecting the mass to the action of a solvent solution of comparatively high dissolving efficiency for a comparatively short period of time, positively and actively agitating the mass and the solution during the said period, subjecting the mass to a dehydrating action thereby withdrawing from it a major portion of the solution together with the dissolved values contained therein, subjecting the remaining mass to the action of a similar solvent solution of comparatively low dissolving efficiency for a comparatively long period of time, positively and actively agitating the mass and the solution during the said period, subjecting the mass to a second dehydrating action thereby withdrawing from it a major portion of the second solution together with the dissolved values contained therein, extracting the dissolved values from each of the said solutions independently of the other, and returning each of the said solutions to its initial point of action.

3. The herein described process for effecting the separation of metal from an ore mass, which consists in subjecting the mass for a comparatively short period of time to the action of a solvent solution adapted to dissolve the desired metal and having a relatively high dissolving efficiency, relatively violently agitating the ore mass and the solution during the said period, subjecting the mass to a dehydrating action thereby separating from it all but a small portion of the solution together with the dissolved metal contained therein, mixing with the mass and the unseparated solution a second solvent solution of relatively low dissolving efficiency, agitating the resultant mixture relatively less violently for a comparatively long period of time, and subjecting the mass to a second dehydrating action thereby again separating from it all but a small portion of the solution together with the dissolved metal contained therein.

4. The herein described process of separating metallic values from an ore mass, which consists in supplying to a receptacle the said ore mass and a solvent solution adapted to dissolve the desired values, the dissolving efficiency of the said solution being comparatively high, relatively violently agitating the mixture of ore and solution for a comparatively short period of time while in the said receptacle, separating from the mass the major portion of the solution together with the dissolved values contained therein, delivering the ore mass to another receptacle together with a solvent solution of comparatively low dissolving efficiency, agitating the second mixture of ore and solution relatively less violently for a comparatively long period of time while in the said second receptacle, again separating from the mass the major portion of the solution together with the dissolved values contained therein, extracting from each of the said separated solutions independently of the other the said dissolved values, and returning each of the said solutions after the extraction of the said dissolved values to its point of initial action.

5. The herein described process of extracting soluble metallic values from ore, which consists in continually moving the ore along a path and subjecting it to a plurality of series of continuous operations at successive parts of the path, each series involving the action upon the ore of a body of a solvent solution, the subsequent separation from the ore of a part of the body of solution, and the return of a part of the separated solution to its initial point of action, and in continually supplying to each body of solution an amount of free liquid equivalent to that carried from the body by the ore.

6. The herein described process of extracting metallic values from ore, which consists in moving the ore along a path and subjecting it to a plurality of series of operations at successive parts of the path, each series involving the action upon the ore of a body of solvent solution, the subsequent separation from the ore of a part of the solution and the return of a part of the separated solution to its initial point of action, and in supplying to each body of solution an amount of free liquid equivalent to that carried from it by the ore, the liquid supplied to the last body being water and the liquid supplied to each of the other bodies being solution from the next succeeding body.

7. The herein described process of obtaining metallic values from ore, which consists in moving the ore along a path and subjecting it to a plurality of series of operations at successive parts of the path, each of the said series involving the subjection of the ore to the action of a body of solvent solution adapted to dissolve the desired values, the subsequent separation from the ore of a major portion of the solution and the return of a part of the separated solution to its initial point of action, in returning from each succeeding body of solution to the preceding one an amount of solution equivalent to that carried from the preceding to the succeeding body by the ore, and in supplying to the solution returned from the second to the first body an amount of solvent equivalent to that discharged with the ore mass from the last body and the amount used in dissolving the metallic values.

8. The herein described process for the extraction of soluble values from a mass, which consists in subjecting the mass while relatively rich in the said soluble values to the action of a solvent solution during a relatively short period of time, relatively violently agitating the mixture of the mass and the solution during the said period, withdrawing from the mass the major portion of the solution together with dissolved values contained therein, subjecting the mass while relatively less rich in the said soluble values to the action of fresh solution during a relatively long period of time, relatively less violently agitating the mixture of the mass and the second solution during the said period, and withdrawing from the mass the major portion of the said second solution together with the dissolved values contained therein.

9. The herein described process for the extraction of metallic values from ore, which consists in passing the ore from point to point along a path, agitating it relatively violently at certain points along its path for a relatively short period of time in the presence of a solvent solution adapted to dissolve the desired values, withdrawing from the ore the major portion of the solution together with the dissolved values contained therein, agitating the ore relatively less violently at other points along its path for a relatively long period of time in the presence of a second solvent solution, and withdrawing from the ore the major portion of the said second solution together with the dissolved values contained therein.

10. The herein described process for the extraction of metallic values from ore, which consists in causing a plurality of bodies of solvent solution adapted to dissolve the desired values to continually pass around a corresponding plurality of endless paths, in causing ore to move to be successively engaged by the bodies of solution in the said paths, extracting from the solvent solution in each of the said paths the dissolved values, and continuously supplying to the body of solvent solution in each of the said paths an amount of free liquid equivalent to that retained by the ore and thereby withdrawn from the said path.

11. The herein described process for the extraction of metallic values from ore, which consists in causing a plurality of bodies of solvent solutions adapted to dissolve the desired values to pass around a corresponding plurality of endless paths, in causing a body of ore to be moved to be engaged successively by the bodies of solution in the said paths, removing from the solution in each of the said paths the values dissolved from the ore, and returning from each succeeding path to each preceding path an amount of liquid equivalent to that carried from each preceding path to each succeeding path with the said ore.

12. The herein described process for the extraction of metallic values from ore, which consists in causing a plurality of bodies of solvent solution adapted to dissolve the desired values to pass around a corresponding plurality of endless paths, causing a body of ore to move to be successively engaged by the bodies of solutions in the said paths, withdrawing from each of the said bodies of solution the values dissolved from the ore, returning from each succeeding path to each preceding path an amount of liquid equivalent to that carried by the ore from each preceding path to each succeeding path, and supplying to the last path an amount of liquid equivalent to that discharged from the said last path with the ore.

13. The herein described process for the extraction of metallic values from ore, which consists in causing a plurality of bodies of solvent solution adapted to dissolve the desired values to pass around a corresponding plurality of endless paths, causing a body of ore to move to be successively engaged by the bodies of solution in the said paths, extracting from the solution in each of the said paths the values dissolved from the ore, returning to each preceding path from each succeeding path an amount of liquid equivalent to that carried by the ore from each succeeding path to each preceding path, supplying to the last path an amount of liquid equivalent to that discharged from it with the ore, and adding to the solution in the first path an amount of solvent equivalent to that used in the process of dissolving in the various paths and to that discharged with the ore from the last path.

14. The herein described process for the extraction of metallic values from ore, which consists in causing a plurality of bodies of solvent solution adapted to dissolve the desired values to continually pass around a corresponding plurality of endless paths, in causing ore to move to be successively engaged by the bodies of solution in the said paths, extracting from the solvent solution in each of the said paths the dissolved values, supplying to the body of solvent solution in each of the said paths an amount of free liquid equivalent to that retained by the ore and thereby withdrawn from the said path, and supplying solvent to the first body of solution to maintain the strength thereof, solvent being supplied to each of the succeeding bodies of solution from the next preceding body by the solution which is carried with the ore from the preceding to the succeeding body.

15. The herein described process for the extraction of metallic values from ore, which consists in causing a plurality of bodies of solvent solution, adapted to dissolve the desired values, to pass around a corresponding plurality of endless paths, causing a body of ore to move, to be successively engaged by the bodies of solutions in the said paths, extracting from the solution in each of the said paths the values dissolved from the ore and adding to the solution in the first path an amount of liquid equivalent to that carried by the ore from the first path to the second, the amount of liquid carried by the ore from each of the other paths being counter-balanced by the amount of liquid carried by the ore to the said paths.

In testimony whereof, we have respectively attached our signatures each in the presence of two witnesses.

ROBERT S. TOWNE.
CYRUS ROBINSON.

Witnesses:
  W. T. GILLESBY,
  H. R. WINTERBOTTOM.